Patented Dec. 17, 1929

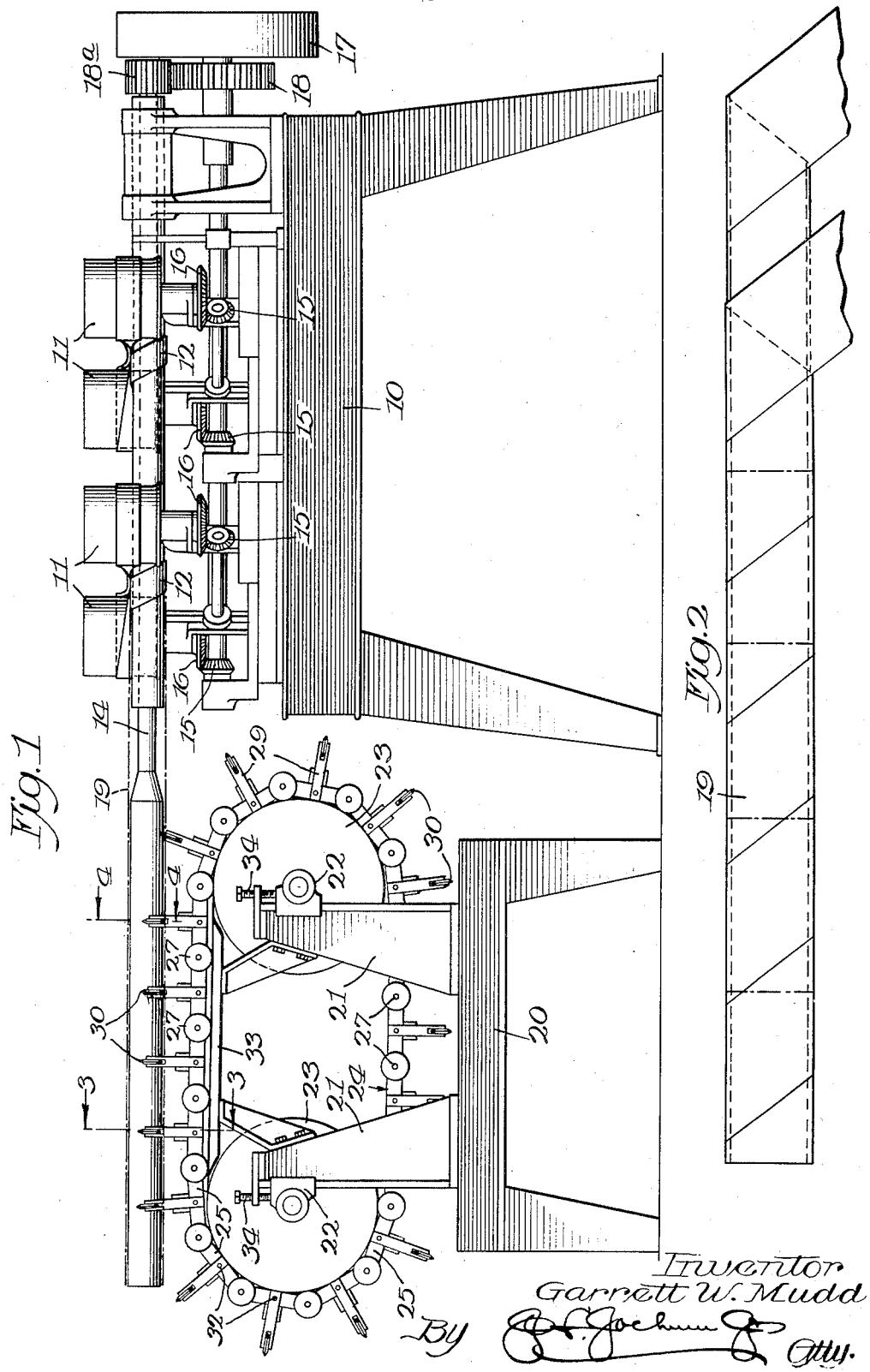

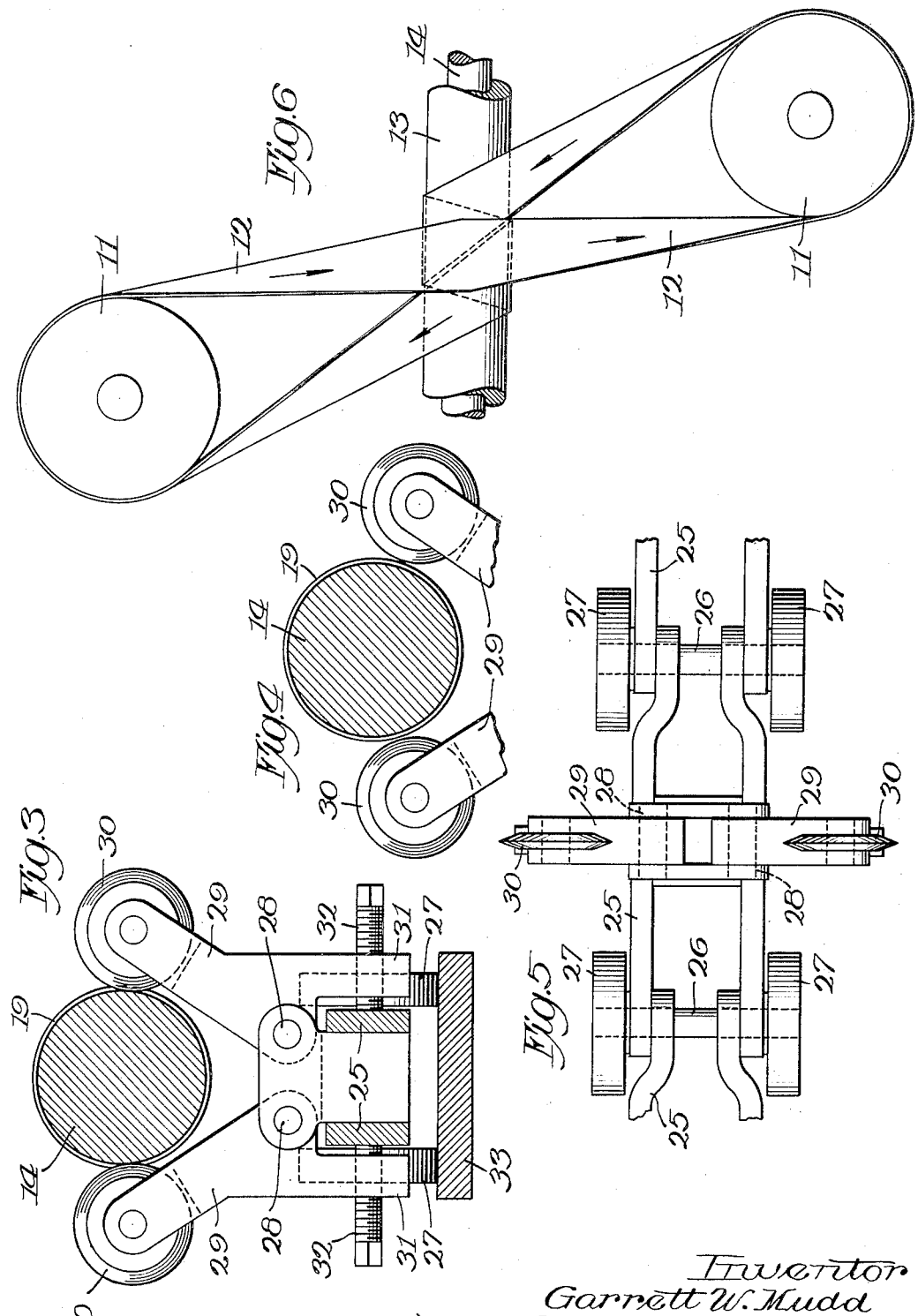

1,740,430

UNITED STATES PATENT OFFICE

GARRETT W. MUDD, OF CHICAGO, ILLINOIS, ASSIGNOR TO MANUFACTURERS MACHINERY COMPANY, OF CHICAGO, ILLINOIS, A CORPORATION OF ILLINOIS

TUBE-CUTTING MACHINE

Application filed August 5, 1927. Serial No. 210,775.

This invention relates to improvements in tube cutting machines particularly adapted, though not necessarily limited in its use in connection with any standard tube winding machine, and one of the objects of the invention is to provide an improved cutting machine of this character by means of which the formed tube is cut into sections of predetermined lengths.

A further object is to provide an improved cutting machine of this character which will be actuated by the operation of feeding the tube thereto and by the tube itself, the cutters operating successively and simultaneously to cut the lengths of tube while the tube is being advanced.

A further object is to provide an improved machine of this character in which the cutters may be adjusted whereby tubes of varying diameters may be cut.

A further object is to provide an improved cutter of this character which will be simple and compact in construction and continuous in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a side elevation of a machine of this character constructed in accordance with the principles of this invention and showing the same as applied to an ordinary tube winding machine.

Figure 2 is a top plan view of one of the tubes to be cut.

Figure 3 is a detail sectional view taken on line 3—3, Figure 1.

Figure 4 is an enlarged detail sectional view taken on line 4—4, Figure 1.

Figure 5 is a top plan view of one pair of cutters and a portion of the conveying means to which they are attached.

Figure 6 is a view showing the manner of rotating the tubes in the winding machine.

Referring more particularly to the drawings the numeral 10 designates generally the support of a tube winding machine having drums 11 arranged to rotate about upright axes and about which drums a belt 12 passes, and which belt in turn encompasses the tube 13 about a mandrel 14.

The drums 10 are rotated by means of intermeshing gears 15—16 driven from a pulley 17, and the mandrel 14 is also rotated by means of a gear 18 meshing with a gear 18ª that is connected with the mandrel.

All of the above referred to parts are of the ordinary and well known construction and constitute no portion of this invention.

The tube cutter is adapted to be arranged adjacent the tube forming machine and to cut the tube into predetermined and desired lengths as it is advanced by the tube forming machine.

To that end the mandrel 14 is extended to project beyond the forming machine and the tube 19 is sleeved over the mandrel.

Arranged adjacent the tube forming machine is a support 20 upon which uprights 21 are mounted, and journaled in these uprights in suitable bearings 22 are pulleys 23, over which an endless flexible traveling element 24 passes. This element is preferably formed by means of links 25 (see particularly Figure 5) pivotally connected together by means of pins 26 and upon which pins rollers 27 are mounted.

The uprights 21 may be spaced for any desired distance according to the length that it is desired of the endless member and of the number of cutters to be carried thereby.

This endless member passes over the pulleys 23 and one run of the member is adapted to move adjacent the path of movement of the tube as it is advanced from and by the forming machine and in proximity to the extended portion of the mandrel 14.

Pivotally mounted upon certain of the links 25 and intermediate their ends as at 28 are supports 29 arranged opposite to each other and rotatably mounted upon each of the supports is a cutter 30. The free ends 31 of the supports 29 terminate in proximity to the sides of the respective links 25 and adjustably passing through the extended portions 31 are adjusting screws 32, by means of which the members 29 may be adjusted about their pivots 28 and the cutters 30 moved toward or away from each other to compensate tubes of varying diameters that are to be cut.

These cutters 30 are mounted to rotate on axes extending in the general direction of travel of the tube 19.

Arranged in proximity to the mandrel 14 and intermediate the pulleys 23 is a track 33 upon which the rollers 27 are adapted to run so as to hold the cutters 30 in proper position and against the tube 19 as it is being advanced.

Obviously by adjusting the bearings 22 upon the supports 21 by means of the adjusting screws 34 the pulleys 23 may be raised or lowered and thereby determine the point at which the cutters will engage the tubes.

As the tube is fed from the forming machine it will pass between adjacent and co-operating cutters 30 and the advancing movement of the tube by the forming machine will cause the endless member 24 to be advanced, and as this member is advancing the respective pairs of cutters will be brought into contact with the tube and the further advancing movement of the endless member 24 will cause the rollers 27 to ride upon the track 33, thereby holding the cutters in operative position with respect to the tubes.

The cutters and the endless flexible member 24 are advanced by the advancing movement of the tube and as the tube is rotated while it is being formed by means of the belts 12, the rotary movement of the tube will impart a rotary movement to the cutters 30 with respect to their supports 29, with the result that the tube will be severed in sections of predetermined lengths according to the position at which the cutters are arranged.

By adjusting the screws 32 the cutting apparatus is adapted to be used in connection with the manufacture of tubes of varying diameters.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A tube cutting machine embodying an endless series of rotary cutters, a tube guide, and a carriage upon which said cutters are mounted, said carriage movable lengthwise of and in co-operative relation with the tube guide, said carriage and cutters adapted to be impelled by the advancing tube as it is cut.

2. A tube cutting machine embodying means for guiding a traveling tube, and a plurality of pairs of opposed cutters movable along the line of travel of the tube and between the advancing pairs of which the tube is fed, the said cutters being advanced by the engagement of the cutters with the advancing tube.

3. A tube cutting machine embodying an endless traveling element, a plurality of pairs of rotatably mounted and opposed cutters carried thereby, said pairs being spaced in directions lengthwise of the element, a mandrel extending along the path of travel of the cutters and over which mandrel the tube is fed, a track member adjacent the mandrel and also the line of travel of the cutters whereby the cutters will be held in contact with the tube, said cutters and element being advanced by the engagement of the tube with the cutters, means for rotating the tubes as they are advanced, said cutters being rotated by the engagement of the tube therewith, and means for varying at will the distance between the opposed cutters of the respective pairs.

4. A tube cutting machine embodying means for guiding a traveling tube, an endless traveling member, a plurality of pairs of supports pivotally mounted thereupon, rotatable cutters carried by the supports, and means adjustably engaging the supports on one side of the pivots and contacting with the said member for adjusting the supports about their pivots and for maintaining them in their adjusted positions.

5. A tube cutting machine embodying means for guiding a traveling tube, an endless traveling member, a plurality of pairs of supports pivotally mounted thereupon, rotatable cutters carried by the supports, means adjustably engaging the supports on one side of the pivots and contacting with the said member for adjusting the supports about their pivots and for maintaining them in their adjusted positions, and a guide arranged along the line of travel of one of the runs of said endless member and over which guide said run passes for holding the cutters in contact with the tube.

6. A tube cutting machine embodying means for guiding a traveling tubing, an endless cutter carriage disposed along the path of movement of the tubing, and a series of opposed cutters disposed on the said carriage to receive the advancing tubing in cutting relation therebetween, said cutters and carriage being impelled by the cutting engagement of said cutters with the advancing tube.

7. A tube cutting machine embodying means for guiding a traveling tubing, an endless cutter carriage disposed along the path of movement of the tubing, a series of opposed cutters disposed on the said carriage to receive the advancing tubing in cutting relation therebetween, said cutters and carriage being impelled by the cutting engagement of said cutters with the advancing tube, and means for varying the position of the opposed cutters with respect to each other to compensate tubes of varying diameters.

In testimony whereof I have signed my name to this specification, on this 25th day of July, A. D. 1927.

GARRETT W. MUDD.